United States Patent [19]

Nussbaumer et al.

[11] Patent Number: 4,718,302
[45] Date of Patent: Jan. 12, 1988

[54] EPICYCLIC DISTRIBUTOR GEAR-BOX FOR DRIVING TWO VEHICLE AXLES OF A MOTOR VEHICLE

[75] Inventors: Erwin Nussbaumer, Waiblingen; Rainer Gross, Stuttgart; Herbert Botzelmann, Remshalden; Hans Haller, Hattenhofen; Franz Buchwald, Lauffen, all of Fed. Rep. of Germany

[73] Assignee: Daimler-Benz Aktiengesellschaft, Stuttgart, Fed. Rep. of Germany

[21] Appl. No.: 3,506

[22] Filed: Jan. 15, 1987

[30] Foreign Application Priority Data

Jan. 15, 1986 [DE] Fed. Rep. of Germany ....... 3600874

[51] Int. Cl.$^4$ ............................ F16H 1/44; F16H 1/42
[52] U.S. Cl. .................................... 74/710.5; 74/714; 192/85 CA; 192/91 A
[58] Field of Search ............................ 74/710.5, 714; 192/85 C, 85 CA, 91 R, 91 A

[56] References Cited

U.S. PATENT DOCUMENTS

| 3,605,965 | 9/1971 | Thomas et al. | 192/85 CA |
| 3,800,928 | 4/1974 | Pray | 192/85 CA |
| 3,899,938 | 8/1975 | Crabb | 74/714 X |
| 4,440,279 | 4/1984 | Schreiner | 192/91 A |
| 4,607,730 | 8/1986 | Paisley | 192/91 R X |
| 4,657,127 | 4/1987 | Boffelli | 192/85 CA |

FOREIGN PATENT DOCUMENTS

| 1153265 | 8/1963 | Fed. Rep. of Germany ... 192/91 A |
| 3212495 | 10/1983 | Fed. Rep. of Germany . |

*Primary Examiner*—Dirk Wright
*Attorney, Agent, or Firm*—Barnes & Thornburg

[57] ABSTRACT

In an epicyclic distributor gear-box for driving two vehicle axles of a motor vehicle, a main shaft concentric with one of two coaxial main shafts is connected to the sun wheel of an epicyclic gear-box. Each of the two other gear elements of the epicyclic gear-box are connected to one of the coaxial main shafts. A lock-up plate clutch connected to two of the gear elements is engaged by a spring and disengaged by an axial pressure piston. Each half-clutch has a plate carrier and one of the plate carriers has an abutment supporting all the plates. The abutment is both immovably fixed on the concentric main shaft by releasable fasteners and is provided with axial passage for a clutch disengagement assembly. The spring maintains the engaged end position and is located on the sun wheel side of the plate carrier having the abutment and the axial pressure piston is located on the other side.

In this way, the concentric main shaft and the lock-up plate clutch are designed as a unit which can be preassembled and is compact.

17 Claims, 1 Drawing Figure

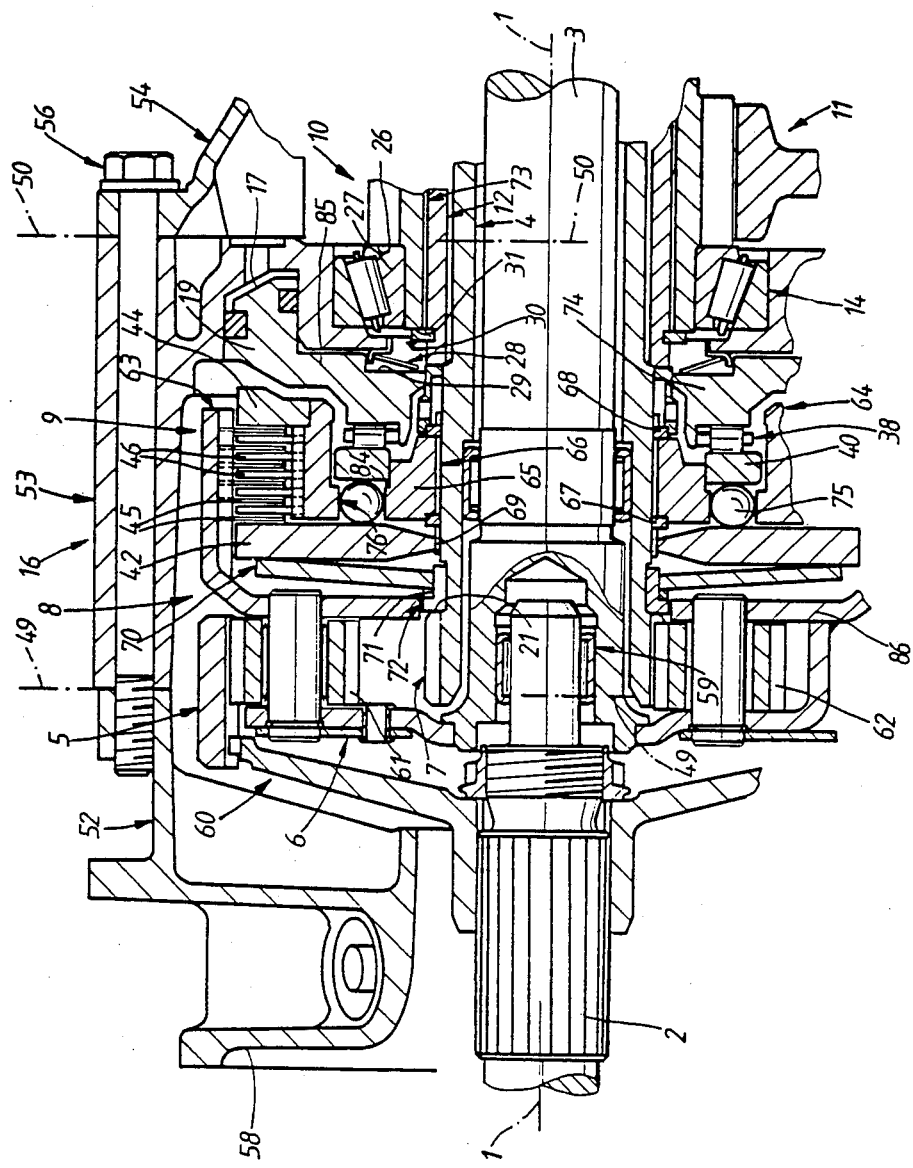

EPICYCLIC DISTRIBUTOR GEAR-BOX FOR DRIVING TWO VEHICLE AXLES OF A MOTOR VEHICLE

BACKGROUND AND SUMMARY OF THE INVENTION

The invention concerns an epicyclic distributor gear-box for driving two vehicle axles of a motor vehicle.

In a known distributor gear-box of this type, shown in DE-OS 3,212,495, the concentric main shaft emerges from the distributor gear-box casing through a casing opening pointing, in the direction of the main axis of the distributor gear-box, towards the speed change gear-box fitted upstream in the force flow direction. The spring means, which acts in the disengagement direction, and the axial pressure piston, which engages the lock-up plate clutch and is located eccentric to the gear-box main axis, is accommodated on the side of the lock-up plate clutch opposite to the epicyclic gear. In this known distributor gear-box, the plate carrier holding the outer plates is connected to the planet carrier and the plate carrier holding the inner plates is connected to the coaxial main shaft connected to the internal toothed wheel of the epicyclic gear.

The objective of the invention is to design the lock-up plate clutch in a distributor gear-box as a structural unit which can be pre-assembled while avoiding emergence of the concentric main shaft, from which the drive of one vehicle axle takes place, at a gear-box casing opening on the side facing the speed change gear-box.

One advantage, among others, in the distributor gear-box according to the invention is that the concentric main shaft, together with the inner plate carrier, all the plates and the abutment for the plates can be pre-assembled and adjusted along with the plate spring and its associate abutment.

Another advantage of the distributor gear-box according to the invention is that the concentric main shaft is located in the central part of the gear-box casing.

Yet another advantage of the distributor gear-box according to the invention is that a compact structural shape is achieved in both the axial and radial directions.

These and other objects are attained by providing a first plate carrier of the lock-up plate clutch having the abutment which actually supports all the plates immovably fastened by releasable fasteners to the concentric main shaft, which is connected to the sun gear of the epicyclic gear-box and providing an axial passage in the first plate carrier through which a clutch disengagement means passes. A spring maintains the lock-up clutch in its engaged end position and is located on the sun gear side of the first plate carrier. The axial pressure piston which opposes the spring is centrically located relative to the main axis of the gear-box and is on the other side of the first plate carrier. A second abutment supports the spring and is immovably mounted to the first carrier. The spring being a spring plate has its radially inner edge supported on the concentric main shaft and it radially outer edge supported on an annular pressure plate which acts on the clutch plates. The pressure plate is irrotationally connected to the first plate carrier and the concentric main shaft. The clutch disengagement means acts on the pressure plate. A stop immovably mounted to the first plate carrier limits the disengagement of the clutch disengagement assembly. The clutch disengagement assembly includes a plurality of balls axially displaced in a guide and held in contact with the pressure plate. The axial pressure piston is connected to the balls via rolling contact thrust bearing and a setting ring centered about the gear-box main axis for actuation of the balls. The axial pressure piston is formed integrally with a pressure ring which acts on the roller contact thrust bearing. The roller contact thrust bearing is located concentrically interior to the clutch plates. The axial pressure piston is located axially near the clutch plates and is connected by a radial diaphragm to the pressure ring. A spring supported between the pressure ring and the gear-box casing holds the contact thrust bearings without clearance. The planetary carrier of the epicyclic gear-box is connected to the second plate carrier. A side disk of the planet carrier is integrally formed with the second plate carrier.

Other objects, advantages and novel features of the present invention will become apparent from the following detailed description of the invention when considered in conjunction with the accompanying drawings.

BRIEF DESCRIPTION OF THE DRAWING

The FIGURE is a cross-sectional view of an epicyclic distributor gear-box incorporating the principles of the present invention.

DETAILED DESCRIPTION OF THE DRAWINGS

An epicyclic distributor gear-box has a gear-box casing 16 which is subdivided into three casing parts by two mutually parallel separating planes 49—49 and 50—50 perpendicular to the gear-box main axis 1—1. The three casing parts are an adaptor casing 52, an epicyclic gear casing 53 and a spur gear casing 54. The three casings 52 to 54 are clamped together by fastening bolts 56. A main shaft 2 coaxial with the gear-box main axis 1—1 protrudes through a front face casing opening 58 of the adaptor casing 52 into the gear-box casing 16. The main shaft 2 can be formed by the gear-box output shaft of a manually operated speed change gear-box which is flanged onto the driving engine of a motor vehicle. The rear end of the main shaft 2 is both rotationally solidly connected via a drive spider 60 to the internal toothed wheel 5 of the epicyclic gear 8 and supported by a journal needle bearing 59 on the front shaft end of a main shaft 3 centered about the gear-box main axis 1—1. The rear shaft end main shaft 3 is rotatably supported, in a manner not shown, in an additional casing end part and can be in continuous connection with the axle drive of one driving axle of a motor vehicle in the conventional manner. The front shaft end of the main shaft 3 is rotationally firmly connected to a planet carrier 6 on which mutually engaging inner and outer planets 61 and 62 are rotatably supported. Whereas the outer planets 61 engage the internal toothed wheel 5, the inner planets 62 are in engagement with a sun wheel 7 which is integrally formed with a hollow main shaft 4 concentric to the main shaft 3. The epicyclic gear 8 can be locked by means of a lock-up plate clutch 9 accommodated in the epicyclic gear casing 53. The outer plates 45 of lock-up plate clutch 9 are held rotationally fixed but axially displaceable in axial grooves of an outer plate carrier 63 in the conventional manner. The outer plate carrier 63 is designed to be rotationally fixed relative to the planet carrier 6. Inner plates 46 are held rotationally fixed but axially displaceable in a similar manner in axial grooves of an inner plate carrier 64 and are interspersed between the outer plates 45.

The inner plate carrier 64 is formed integrally with a radially inner clutch hub 65 which is located rotationally fixed by corresponding splines 66 on the concentric main shaft 4 of the sun wheel 7. Inner clutch hub 65 is located axially non-displaceably on the same shaft by lock rings 67 and 68 located on the end faces. The lock rings 67 and 68 with or without splines 66 form a releasable fastener. The plate package 45, 46 is in contact with an annular abutment 44 in the direction of the gear-box main axis 1—1 away from the epicyclic gear 8. The abutment 44, at least in this direction, is immovably fixed relative to the inner plate carrier 64. An annular pressure plate 42 is located at the end of the plate package 45, 46 opposite to the abutment 44. The pressure plate 42 can be supported on the neighboring external plate 45 and can be fixed, by splines 69 via the appropriate splines 66, so that it cannot rotate relative to the main shaft 4 and therefore relative to the inner plate carrier 64.

The pressure plate 42, which can move relative to the plate package 45, 46 along with gear-box main axis 1—1, is actuated by a plate spring 70 to engage the lock-up plate clutch 9. The radially inner edge region of plate spring 70 can be axially supported on a support ring 71 which has sliding location on an L-shaped, axially slotted support ring 72. The support ring 72 is inserted in a peripheral groove provided in the main shaft 4 between the spline 66 and the sun wheel 7 of this main shaft 4. Under the action of the plate spring 70, support ring 72 is supported on the neighboring end surface 21 of the sun wheel 7. The end surface 21 provides axial pressure support and the side boundary of the peripheral groove mentioned.

An input wheel 10 of an axial offset spur gear-box 11 is supported at one of its ends by a conical roller bearing 14 in the gear-box casing 16 centered about the gear-box main axis 1—1. The input wheel 10 is rotationally mounted on an external hollow shaft 12 by splines 73. The shaft 12 is rotationally supported by the conical roller bearing 14. In addition, the input wheel 10 is immovably fixed axially relative to the outer hollow shaft 12 by one end surface 31 of its wheel hub, in contact with a locking ring 30 of the hollow shaft 12 used as axial pressure support surface.

The epicyclic gear casing 53, accommodating the conical roller bearing 14, has a central annular actuating Pressure chamber 17 with an axial annular piston 19. A pressure ring 74 integrally formed with a piston 19 actuates the lock-up plate clutch 9 in the disengagement direction and is located axially between the hub 65 and the conical roller bearing 14. A clutch disengagement assembly includes the pressure ring 74 acting via a rolling contact thrust bearing 38 on a setting ring 40 which, in turn, actuates the pressure plate 42 via balls 75. Whereas the setting ring 40 is centered on a shoulder 84 of the hub 65, the balls 75 are guided axially in corresponding axial passages 76 of the hub 65. The shoulder 84 also limits the disengagement movement of the disengagement means.

The concentric main shaft 4 and the outer hollow shaft 12 can be brought into drive connection by an axle connection plate clutch, which is then located on the side of the input wheel 10 opposite to the lock-up plate clutch 9 and can be actuated in the engagement direction by an axial annular piston (not shown).

In the lock-up plate clutch 9, the engagement forces from the plate spring 70 and the corresponding abutment forces on the abutment 44 are taken by the axial pressure support surface 21 and the locking ring 68 on the concentric output shaft 4 so that no external forces appear. The abutment force resulting from the pressure applied to the axial annular piston 19 when disengaging the clutch is taken either by the axial pressure support surface 21 alone, or additionally by the locking ring 67, and is introduced into the concentric main shaft 4. From the shaft 4, the force flow then runs in a manner not shown into the outer hollow shaft 12 which is then supported by means of a shoulder on the wheel hub of the input wheel 10. Input wheel 10 introduces the abutment force by its end surface 26 into the inner race ring 27 and, therefore, via the conical roller bearing 14 adjacent to the lock-up plate clutch 9 into the gear-box casing 16.

A plate spring 28, supported between the epicyclic gear casing 53 and an end surface 29 of the pressure ring 74, holds the rolling contact thrust bearing 38 without clearance when the relevant axial annular piston 19 is relieved of pressure.

The input wheel 10 is in drive connection, in a manner not shown, via at least one intermediate wheel with the output wheel of the offset axis gear-box 11 which, in turn, is connected to an auxiliary drive shaft leading to the axle drive of the second vehicle axle.

The conical roller bearing 14 and the axial annular piston 19 are concentrically located relative to one another such that the end surface 26 forming the boundary of the teeth of the input wheel 10 approximately coincides with the separating plane 50—50. The position of the separating plane in the directions of the gear-box main axis 1—1 is also characteristic of the relevant position of the offset axis gear-box 11. Thus, the gear-box 11 is closer to the driving engine in the direction of the separating plane 49—49 of the adaptor casing 52.

So that the axial pressure piston 19 can be located concentrically outside the conical roller bearing 14 and the pressure ring 74 can be located in the axial vicinity relative to the same conical roller bearing 14, these parts 19 and 74 are connected together by means of a radial diaphragm 85.

A compact design and simple manufacture of the lock-up plate clutch 9 is also achieved by the fact that its outer plate carrier 63 is formed integrally with the neighboring side disk 86 of the planet carrier 6.

On the one hand, the epicyclic gear 8 can be pre-assembled together with the outer plate carrier 63. On the other hand, the concentric main shaft 4, together with the inner plate carrier 64 and abutment 44, all the plates 45 and 46, the pressure plate 42 with plate spring 70 and the distinct rings 71 and 72, can also be pre-assembled to form a constructional unit. The unit, with the sun wheel 7, can be inserted in advance into the pre-assembled epicyclic gear 8. Using one or more spaced rings 71, it is also possible to set the clutch torque in the pre-assembled condition of the lock-up plate clutch 9. Including the axial pressure piston 9, all the parts of the epicyclic gear 8 and its lock-up plate clutch 9 are accommodated in the smallest space.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. In an epicyclic distributor gear-box for driving two vehicle axles of a motor vehicle, having a main shaft concentric with one of two coaxial main shafts connected to the sun wheel of an epicyclic gear-box, each of two other gear elements of the gear-box are connected to one of the coaxial main shafts, having a lock-up plate clutch connected to two of the gear elements, having spring means and an axial pressure piston means, acting against the spring means for actuating the lock-up plate clutch in the direction of a completely disengaged end position and in the direction of a completely engaged end position, each half clutch of the lock-up plate clutch is connected to a respective first or second plate carrier rotationally firmly connected to the associated plates and holding them so that they are axially displaceable and the first plate carrier has a first abutment axially supporting all the plates, the improvement comprising:

the first plate carrier having the first abutment is both immovably fastened by releasable fastening means to the concentric main shaft and has axial passages for a clutch disengagement means, the spring means both maintains the engaged end position of the lock-up plate clutch and is located on the sun wheel side of the first plate carrier having the first abutment, the axial pressure piston means is located centrally to the gear-box main axis, and is located on the other side of the first plate carrier; and wherein the spring means includes a plate spring, the radially inner edge region of which plate spring is supported on an axial pressure support surface of the concentric main shaft and the radially outer edge region of which plate spring is supported on an annular pressure plate acting on the clutch plates.

2. Distributor gear-box according to claim 1, including a second abutment for supporting the spring means immovably mounted to the first plate carrier.

3. Distributor gear-box according to claim 1, wherein the axial pressure support surface used as the abutment for the plate spring is a side boundary of a peripheral groove in the concentric main shaft, said peripheral groove accepting a slotted L-shaped ring.

4. Distributor gear-box according to claim 3, including a second ring in contact with the plate spring and on the leg of the L-shaped distance ring parallel to the gear-box main axis.

5. Distributor gear-box according to claim 1, wherein the pressure plate is both irrotationally connected to the first plate carrier and is directly supportable on a plate of the second plate carrier.

6. Distributor gear-box according to claim 5, wherein the pressure plate is rotationally firmly connected to the concentric main shaft.

7. Distributor gear-box according to claim 1, wherein said clutch disengagement means acts on the pressure plate.

8. Distributor gear-box according to claim 7, including stop means immovably mounted to the first plate carrier for limiting the disengagement movement of the clutch disengagement means.

9. Distributor gear-box according to claim 8, wherein the clutch disengagement means includes a plurality of balls, each of which is axially displaceably guided in said passage and is held in contact with the pressure plate.

10. Distributor gear-box according to claim 9, wherein the clutch disengagement means includes a setting ring centered about the gear-box main axis for common actuation of the balls and a rolling contact thrust bearing which connects the setting ring with the axial pressure piston.

11. Distributor gear-box according to claim 10, wherein the axial pressure piston is formed integrally with a pressure ring on which the rolling contact thrust bearing is supported and retained.

12. Distributor gear-box according to claim 10, wherein the rolling contact thrust bearing is located concentrically interior the clutch plates.

13. Distributor gear-box according to claim 11, wherein the axial pressure piston is located axially near the clutch plates and is connected by a radial diaphragm to the pressure ring.

14. Distributor gear-box according to claim 11, including a spring supported between the pressure ring and the gear-box casing for holding the rolling contact thrust bearing without clearance.

15. Distributor gear-box according to claim 1, wherein the planet carrier of the epicyclic gear-box is connected to the second plate carrier.

16. Distributor gear-box according to claim 15, wherein a side disk of the planet carrier is integrally formed with the second plate carrier.

17. Distributor gear-box according to claim 1, wherein the pressure plate is rotationally firmly connected to the concentric main shaft.

* * * * *